US 6,668,692 B1

(12) United States Patent
Thiele et al.

(10) Patent No.: US 6,668,692 B1
(45) Date of Patent: Dec. 30, 2003

(54) PROCESS AND DEVICE FOR THE CONTROL OF A MOTORIZED FEED DRIVE

(75) Inventors: Siegfried Thiele, Minden (DE); Reiner Moeres, Bad Oeynhausen (DE)

(73) Assignee: Wilhelm Altendorf GmbH & Co. KG, Minden (DE)

( * ) Notice: Subject to any disclaimer, the term of this patent is extended or adjusted under 35 U.S.C. 154(b) by 0 days.

(21) Appl. No.: 09/346,458

(22) Filed: Jul. 1, 1999

Related U.S. Application Data

(63) Continuation of application No. 08/828,228, filed on Mar. 17, 1997, now Pat. No. 6,516,693.

(30) Foreign Application Priority Data

Apr. 12, 1996 (DE) .......................................... 196 14 418

(51) Int. Cl.[7] .............................. B26D 7/06; B27B 5/16; B27B 25/10
(52) U.S. Cl. .............................. 83/74; 83/72; 83/403.1; 83/426; 83/435.11; 83/435.21; 83/437.1; 83/477.2; 144/242.1; 144/382; 318/2; 409/145; 409/156
(58) Field of Search .............................. 83/403.1, 426, 83/429, 435.11, 435.15, 435.16, 435.21, 477.2, 13, 36, 44, 47, 56, 72, 74, 76, 76.6, 76.7, 76.8, 360, 437.1, 707, 730; 318/443, 446; 409/150, 148, 149, 151, 154, 159; 144/242.1, 250.21, 356, 382

(56) References Cited

U.S. PATENT DOCUMENTS

| 2,497,842 A | * | 2/1950 | Armitage et al. | ....... 318/443 X |
| 2,764,067 A | * | 9/1956 | Armitage et al. | ........... 409/150 |
| 2,963,945 A | * | 12/1960 | Barker et al. | ................ 409/150 |
| 3,497,668 A | * | 2/1970 | Hirsch | ...................... 340/407.1 |
| 3,970,127 A | | 7/1976 | Thiele | ...................... 144/242.1 |
| 3,986,090 A | * | 10/1976 | Hecker et al. | .......... 318/628 X |
| 4,107,590 A | * | 8/1978 | Pury et al. | ................... 318/628 |
| 4,163,929 A | * | 8/1979 | Janu et al. | ................... 318/628 |
| 4,596,172 A | | 6/1986 | Visser | ......................... 83/75.5 |
| 4,644,832 A | | 2/1987 | Smith | ............................. 83/72 |
| 4,950,116 A | | 8/1990 | Nishda | .......................... 415/5 |
| 5,130,625 A | | 7/1992 | Babel | ......................... 318/560 |
| 5,283,508 A | | 2/1994 | Komatsu | ..................... 318/569 |

FOREIGN PATENT DOCUMENTS

| DE | 24 09 420 | 8/1975 | |
| DE | 42 22 906 | 1/1994 | |
| EP | 0 065 918 | 12/1982 | |
| EP | 0 066 501 | 12/1982 | |
| EP | 0 443 968 | 8/1991 | |
| SU | 1174-259 | 8/1985 | ................ 83/403.1 |
| SU | 1458-227 | 2/1989 | ................ 83/403.1 |

OTHER PUBLICATIONS

1983 E. Piwowarsky "Sagen von Acrylglas" (Sawing of Acrylic Glass), *PLASTverarbeiter*, pp. 1123–1126.

* cited by examiner

*Primary Examiner*—Clark F. Dexter
(74) *Attorney, Agent, or Firm*—Altera Law Group, LLC

(57) ABSTRACT

The invention consists of a process for the control of the motorized feed drive for the movable workplace table of a machine tool, in particular the rolling carriage of a circular saw. The manual force that is applied by the operator in direction of the feed is sensed and converted to a corresponding measured value. From this a set value for the feed rate of the rolling carriage is created and from that is derived a control signal for the drive.

13 Claims, 7 Drawing Sheets

PROCESS AND DEVICE FOR THE CONTROL OF A MOTORIZED FEED DRIVE

This application is a Continuation of application Ser. No. 08/828,228, filed Mar. 17, 1997, now U.S. Pat. No. 6,516,693, which application(s) are incorporated herein by reference.

FIELD OF THE INVENTION

The invention pertains to a process for the control of a motorized feed drive for a movable workpiece table of a machine tool, especially the rolling carriage of a circular saw, and a device for the execution of the process, with a workpiece table that with the aid of a motorized feed drive is longitudinally movable.

BACKGROUND OF THE INVENTION

On many machine tools, such as circular saws, the workpiece feed is done by hand. In the case of a circular saw, a workpiece to be sawed is laid down by the operator on the rolling carriage of the circular saw and subsequently pushed toward the circular saw blade in the direction of the cut. The rolling carriage serving as support for the workpiece is moved along with the workpiece (DE-PS 24 09 420). Therefore, when advancing the workpiece, the operator has to overcome not only the cutting force, but also the friction existing between the rolling carriage and the machine frame. Furthermore, the rolling carriage must, prior to each cutting process, first be accelerated together with the workpiece, and after each cutting process be decelerated and subsequently retrieved. Especially with high-quality, i.e. warpfree (rigid against torsion), rolling carriages, the acceleration work for the acceleration and braking of the substantial mass of the rolling carriage is not inconsiderable. Added to this is the (mass) inertia of the workpiece.

Consequently, where many cuts are made in quick succession, the operator must spend substantial energy repeatedly overcoming of the described forces. This results in a faster exhaustion of the operator and in a loss of productivity.

For the overcoming the forces opposing the workpiece feed, motor-driven rolling carriages are conceivable and are already in use for special application cases. For example, for cutting of so-called postforming sheets a constant feed rate is partially applied, which can easily be achieved with a motorized drive. A known design of such a drive consists of a hose that can be charged with compressed air, and on which a drive pulley (wheel)—attached to the rolling carriage—can roll off. If the air hose is blown up on one side with compressed air, the radially expanding air hose replaces the drive pulley and drives thereby the rolling carriage in the direction of the feed.

DE-OS 42 22 906 describes feed hydraulics for sawing machines that adjusts the feed with a constant power corresponding to a set value (set point). Furthermore, electrical drives for a constant feed rate are known. (Periodical "PLASTverarbeiter" October 1983, pages 1123, 1124).

A common disadvantage of the previously known motorized or hydraulic or pneumatic feed drives is their lack of flexibility. However, particularly the high flexibility of the machine tools that can be simply operated manually justifies the expensive employment of the personnel required for their operation.

SUMMARY OF THE INVENTION

Therefore, the object of this invention is the creation of a process for the control of a motorized feed drive, especially for a rolling carriage, that satisfies high requirements for the flexibility of the drive, especially regarding various feed rates, and the creation of a device for the execution of this process.

According to the invention, this object is achieved by a process where the manual force applied by the operator in direction of the feed is sensed and converted into a corresponding measured value, a set value is created from it for the feed rate of the rolling carriage, and from that a control signal is derived for the drive.

The required high flexibility of the feed drive results from the process according to the invention by using the manual force used by the operator for influencing the feed rate of the rolling carriage generated by a motor. A particular advantage of the solution provided by the invention is that it does not require a significant readaptation (retraining) by the operator, because the feed rate depends, also in entirely manually operated machines, such as, e.g., circular saws, directly on the manual force applied by the operator in the direction of feed. The process simultaneously allows a reduction of the manual force that needs to be applied by the operator, to a fraction of that which would be required if the operator would have to effect the feed entirely with his own power. According to the invention, the power of the operator is only required as an input parameter for the control of the feed rate and thereby, in the end, independently of which forces have to be actually applied for the feed.

An advantageous variant of the inventive process is characterized by that the cutting force is determined and considered in the generation of the set value for the feed rate. The consideration of the cutting force allows it, e.g., to reduce the feed rate, if the cutting force rises. The reduction of the feed rate may then be compensated for by an increased manual force of (applied by) the operator, so that the behavior of the motor-driven rolling carriage, controlled according to the invention, approximates that of one that is manually driven. Furthermore, it is also possible to stop the feed in case of an extremely increased cutting force, in order to prevent standstill of the saw blade.

To prevent the start of the feed drive in case of very small manual forces, e.g., those unintentionally applied, the set value of the feed rate is in a preferred variant set at zero as long as the applied manual force does not exceed a threshold value.

Preferably, the set value is created in dependence on the manual force in excess of the threshold value, so that it increases with increasing manual force and decreases with decreasing manual force. This corresponds to the behavior of a manually driven rolling carriage.

Furthermore, a process is preferred in which the set value is created such that it does not exceed an upper limit value, in order to not let the feed rate grow limitless and to prevent control fluctuations triggered by the rolling carriage temporarily escaping the operator so that the manual force of the operator diminishes, resulting in a stoppage of the rolling carriage, to be subsequently set in motion again by the operator.

To assure that the rolling carriage exhibits the expected behavior also in dependence on the cutting force, a process is preferred in which the set value is created in dependence on the cutting force such that it decreases with increasing cutting force and increases with decreasing cutting force. In this case, the set value, even if just based on the influence of the cutting force alone, should preferably not fall below the value zero.

Preferably, upon initiation by the operator it should be possible to create also a negative set value for the feed rate so that the rolling carriage can also be moved backward by motor power. A preferred variant of the process according to the invention is characterized by a set value for the feed rate or a value of a speed control or RPM-control for the feed drive that is imposed as a reference input value.

The inventive solution to the aforementioned task comprises a device where a drive is connected with a control mechanism for the formation of a control signal for the speed of the drive, and the control mechanism contains a manual-force sensor and a control signal generator connected to it. The process according to the invention can be executed with the aid of such a device.

In order to allow also the consideration of the cutting force in the control of the feed drive, the control mechanism in a preferred form of the device contains additionally a device for the determination of the actual cutting force, where the device is also connected to the control signal generator.

In order to facilitate a motorized backward movement of the rolling carriage, the control mechanism of the inventive device preferably contains an element for the presetting of a negative feed rate.

Furthermore, the device according to the invention is preferably equipped with a controller for the feed rate that is tied to the control signal generator. Such a device allows the use of a value for the feed rate that corresponds to the control signal generator as reference input value for the control of the feed rate.

Preferably, the controller is part of the control mechanism or, in an alternative form of execution, part of the feed drive.

BRIEF DESCRIPTION OF THE DRAWINGS

FIGS. 2a, 2b and 2c illustrate the sensor unit of FIG. 2 in different working positions.

DESCRIPTION OF THE PREFERRED EMBODIMENTS

Figure 1:
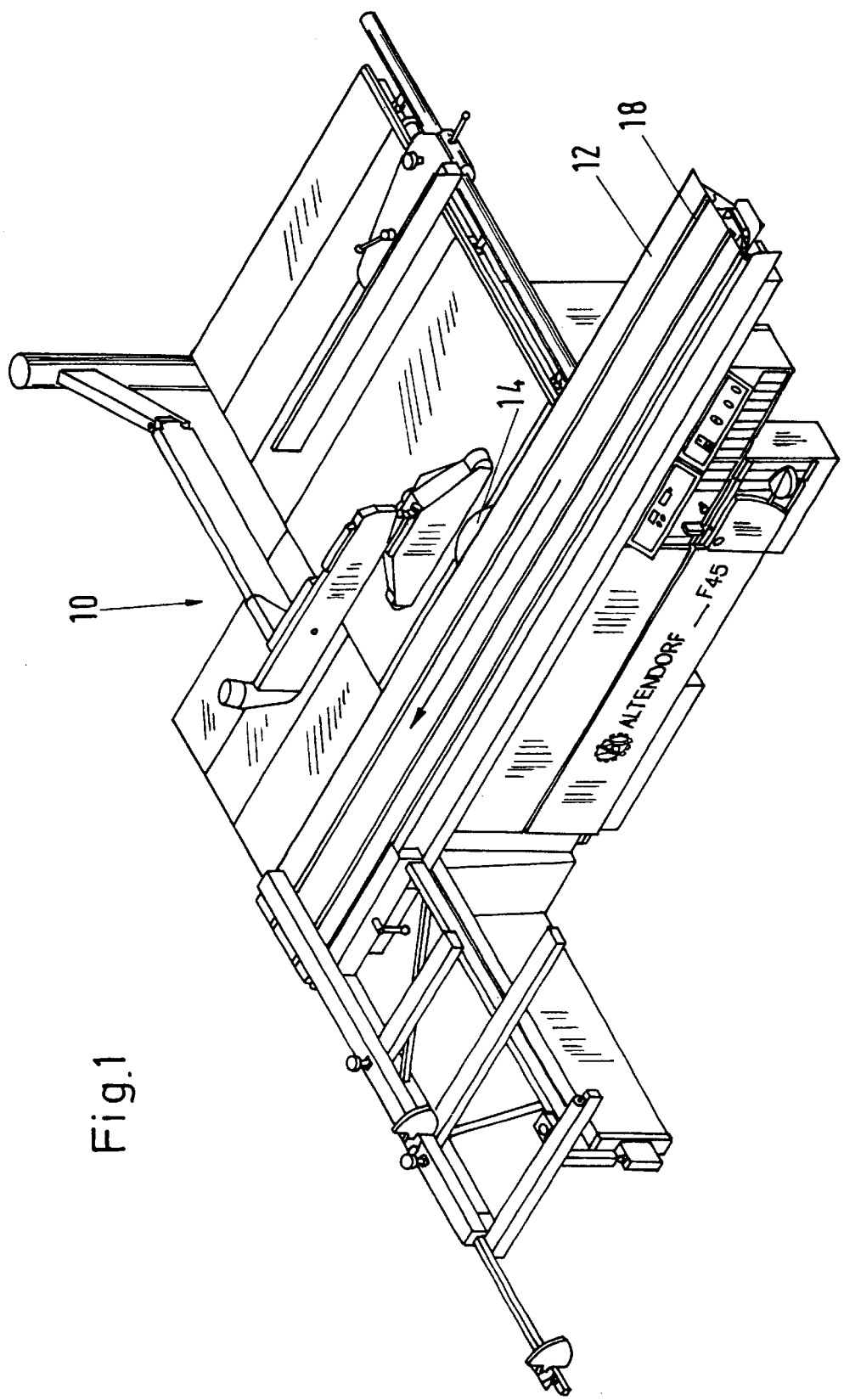
FIG. 1 illustrates a circular panel saw in perspective view which is relevant for the process of the invention.

In the perspective depiction of a panel saw 10 in FIG. 1 a rolling carriage 12, also referred to as a workpiece table, is shown in its middle position, from where the rolling carriage 12 can be moved forward and/or backward until it reaches one of its two end positions. Furthermore, the direction of positive feed rate and positive feed force is indicated by an arrow. The value of the feed force is essentially determined by the rolling friction, the cutting force and—for accelerated rolling carriages—by the mass of the rolling carriage and the workpiece, and the acceleration. For an electric-motor-driven feed drive, the feed force is, through the torque to be provided by the electric motor, approximately proportional to the power consumption of the electric motor for the feed drive.

The already mentioned cutting force acts against the feed force. The peripheral cutting force to be overcome by a main saw motor driving the main circular saw blade must be differentiated from this cutting force (in direction of feed). The value of the peripheral cutting force is reflected in the power consumption of the main saw motor. The two identified cutting forces are connected and are essentially influenced by the material of the workpiece and its geometry, by the feed rate and the properties of the main circular saw blade, i.e. by the number of its teeth, by the shape of the teeth and their degree of dulling, and by the projection of the saw blade beyond the plane defined by the surface of the rolling carriage.

Figure 2:
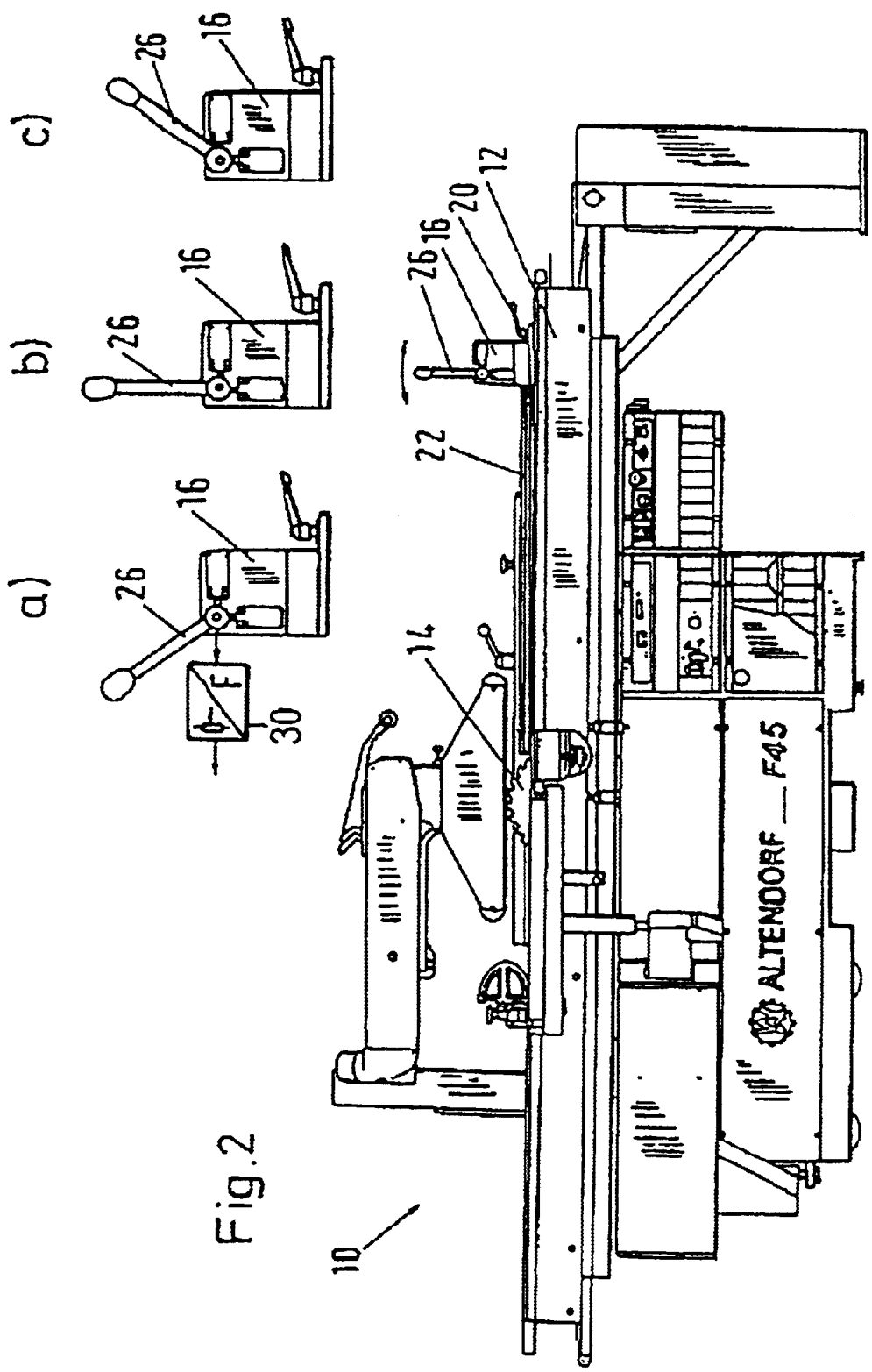
FIG. 2 illustrates a panel saw in side view with a sensor unit attached to the rolling carriage.

In FIG. 2, a panel saw 10 with propelled and controlled rolling carriage 12 is depicted in side view. An external characteristic of the control is a sensor unit 16 that is attached to the surface of the rolling carriage 12 and is removable therefrom. The fastening of the sensor unit 16 to the carriage 12 occurs by a tongue part that is held in a groove 18 (FIG. 1) and can be clamped in place with a clamping lever 20. In the sawing of a workpiece 22, the sensor unit 16 serves simultaneously as a guide for the workpiece laid on the surface of the rolling carriage.

The sensor unit 16 contains a lever 26, with the aid of which the feed drive can be controlled. The possible positions of the lever 26 are clarified in FIGS. 2a to 2c. FIG. 2a depicts a position for a positive feed rate as is desired for sawing. With the middle position of the lever, as depicted in FIG. 2b, the feed drive is turned off, and with the position depicted in FIG. 2c the carriage return, i.e. a negative feed rate, is set. In FIG. 2a when the lever 26 is in its position depicted therein, it functions together with a force sensor (not shown), through which the manual force of the operator can be measured to control the feed drive. FIG. 2a also illustrates a converter 30 which converts a force F sensed by the force sensor into a corresponding electric value.

Additional essential elements of the panel saw 10 with controlled feed drive for the rolling carriage 12 are a control signal generator, a controller for the feed rate, and the drive for the feed. All known types of drives may be considered for the feed, such as, e.g., pneumatic or hydraulic drives, or especially an electric-motor drive. In the last-mentioned case, the rolling carriage 12 is driven by an electric motor through a gear transmission. This case is used as basis for the following description of the control.

Based on the manual force applied by the operator to the lever 26 and determined with the aid of the force sensor, the control signal generator establishes a set value for the feed rate of the rolling carriage. Preferably, a measured value corresponding to the cutting force is also fed to the control signal generator, so that the cutting force can also be considered in the formation of the set value for the feed rate. A measured value corresponding to the cutting force can, e.g., due to the above described connection, be derived from the power consumption of the drive motor for the main circular saw blade 14 or from the speed (RPM) change of the main saw shaft or from the power consumption of the feed motor for the rolling carriage 12. The set value for the feed rate established by the control signal generator is imposed as a reference input value for the feed rate on a controller. Since a proportional connection exists between the feed rate and the speed variation of the driving electric motor that depends on the transmission gear ratio, the controller for the feed rate can, for example, be a speed (RPM) controller for the driving electric motor. The speed controller can in known fashion be a component of the electric drive or, alternatively, be integrated in the control mechanism, especially in the control signal generator.

Known microprocessor controllers might be used as the control signal generator.

How the set value for the feed rate (or for the RPM of the corresponding drive motor) is established in dependence on the two input values—on one hand the manual force to be applied by the operator and on the other hand by the cutting force—is described in the following. Below a threshold value for the manual force, the set value for the feed rate equals zero. In this manner the rolling carriage is prevented from being unintentionally set in motion by a very small manual force. Above this threshold value, the set value for the feed rate increases with increasing manual force or decreases with decreasing manual force. Furthermore, an upper value exists for the set value of the feed rate so that the latter cannot increase without limit, even with very high manual forces. In the simplest case, the connection between the manual force and the set value for the feed rate is above the manual force threshold value and below the upper limit value proportional for the feed rate. However, any other, preferably monotonous connection (i.e. related through a monotone function) or relationship between the two values is conceivable.

The dependence of the set value on the cutting force applies similarly: With increasing cutting force, the set value for the feed rate decreases, but, on the basis of the manual force alone, maximally to the minimum value zero. Conversely, the set value increases with decreasing cutting force, but does not exceed an upper limit value. Between the minimum value zero and the upper limit value, the dependence of the set value on the cutting force can be proportional. However, any other, preferably monotonous connection (i.e. related through a monotone function), is conceivable here.

If the lever 26 is in the center position depicted in FIG. 2b, the set value for the feed rate is set equal to zero. If the lever 26 is, however, set back for the carriage return (FIG. 2c), a negative set value for the feed rate is created so that the rolling carriage runs backward. In order to simplify the controls a fixed value can be preset for the negative set value. However, it is equally possible to provide, for the back lever position (FIG. 2c), a force sensor with the aid of which the negative set value for the feed rate,rand, therefore, the backward (return) speed of the rolling carriage can be controlled.

Finally, there are also provided limit switches with which the drive of the rolling carriage can be stopped before the rolling carriage 12 reaches its mechanically preset end position. The limit switches can act directly on the drive or, alternatively, generate further input signals for the control signal generator.

Figure 3:
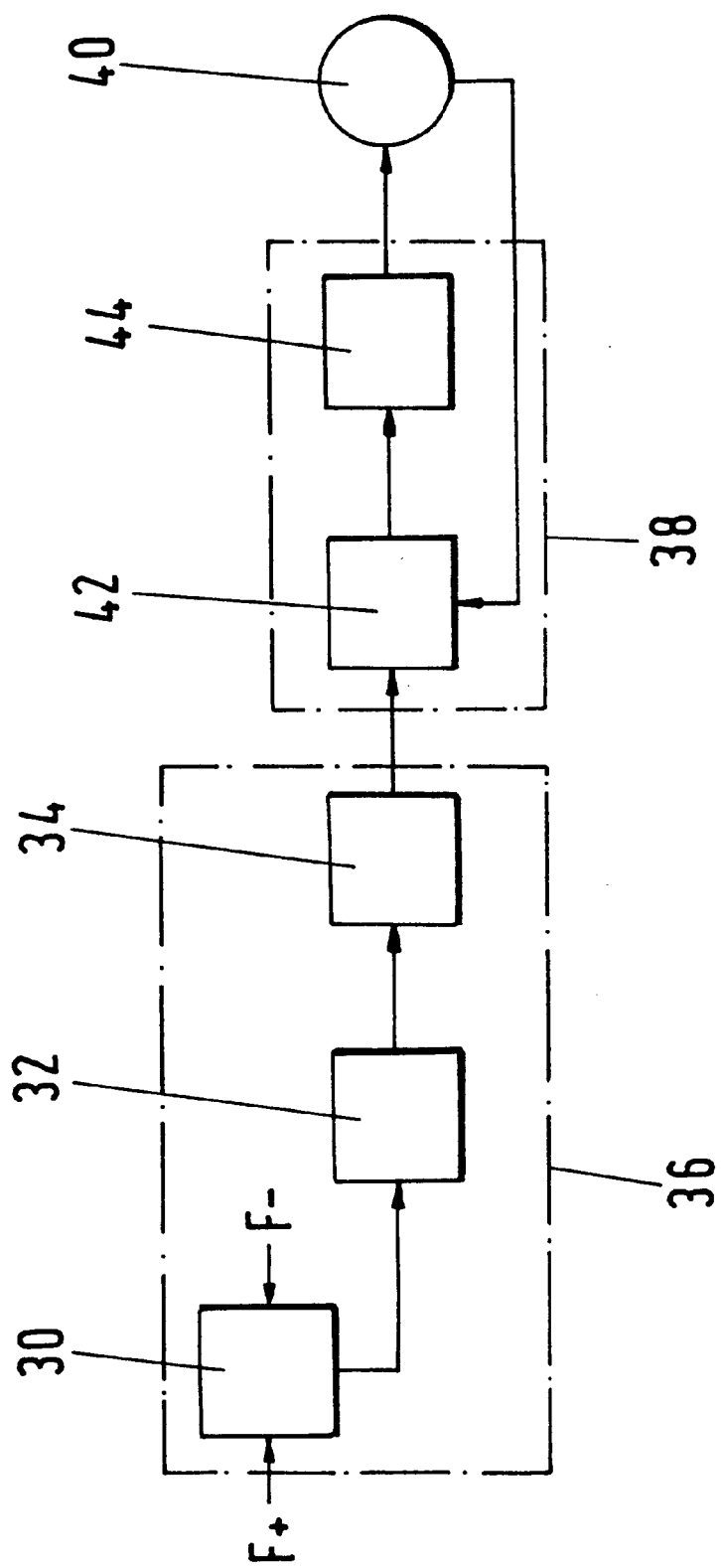
FIG. 3 is a block diagram of the drive control without consideration of the cutting force.

The elements of a drive control without consideration of the cutting force are indicated in the block diagram depicted in FIG. 3. The drive control contains a manual-force sensor 30, with the aid of which the positive and negative manual force (F) of the operator is measured and converted into an electrical signal. Suitable manual force sensors are, e.g., piezoelectric pressure sensors that utilize the piezo effect, or DMS measuring bridges, which, with the aid of strain gauges, measure the (minimal) deformation of an essentially rigid sensor lever. Piezoelectric pressure sensors or DMS measuring bridges function practically pathless. Alternatively, the manual force sensor 30 can also contain a spring that, in dependence on the manual force applied by the operator, is compressed or stretched. The deflection of the spring, corresponding to the manual force applied by the operator, can then, e.g., by capacitive, magnetic, inductive or potentiometric path sensors, be converted to an electrical signal that corresponds to the manual force applied by the operator.

The electrical output signal of the manual force sensor 30 is transmitted to a measuring amplifier 32, which converts and amplifies the measuring signal to a value that is suitable for digital processing and supplies the possibly required auxiliary energy for the manual force sensor 30.

The output signal of the measuring amplifier 32 is transmitted to the control signal generator 34, in which a filtering and signal adaptation (matching) of the measuring signal from measuring amplifier 32 takes place, and in this way output control signal for the rolling carriage drive is generated. Interferences of the measuring signal are dampened and the measuring signal is smoothed out by the filtering of the measuring signal from measuring amplifier 32. In the signal adaptation (matching), the measuring signal from the measuring amplifier 32 is converted to the output signal such that the characteristic curve of the sensor of the manual-force sensor 30 is adapted to any characteristic function curve, optimized to the application. For this, sensible threshold values and limit values are considered. Through utilization of a microcomputer, the function for the signal adaptation, and the consideration of threshold values and limit values, can within wide boundaries be adapted and optimized for obtaining the desired behavior of the signal adaptation (matching). A progressively acting adaptation assures that the support of the feed motion of the rolling carriage 12 by the drive increases superproportionally with increasing manual force. This has the result that the support is minimal for low manual forces and does not diminish the operator's feel. A similar effect can also be obtained such that the support, proportionally to the manual force, becomes effective only from a certain threshold value on.

The manual-force sensor 30 and the measuring amplifier 32 are part of the sensor unit 16 and, together with the control signal generator 34, constitute the control mechanism 36. The output signal of the control signal generator 34 is simultaneously the output signal of the control mechanism 36, i.e. the control signal for the drive of the rolling carriage 12.

Figure 6:
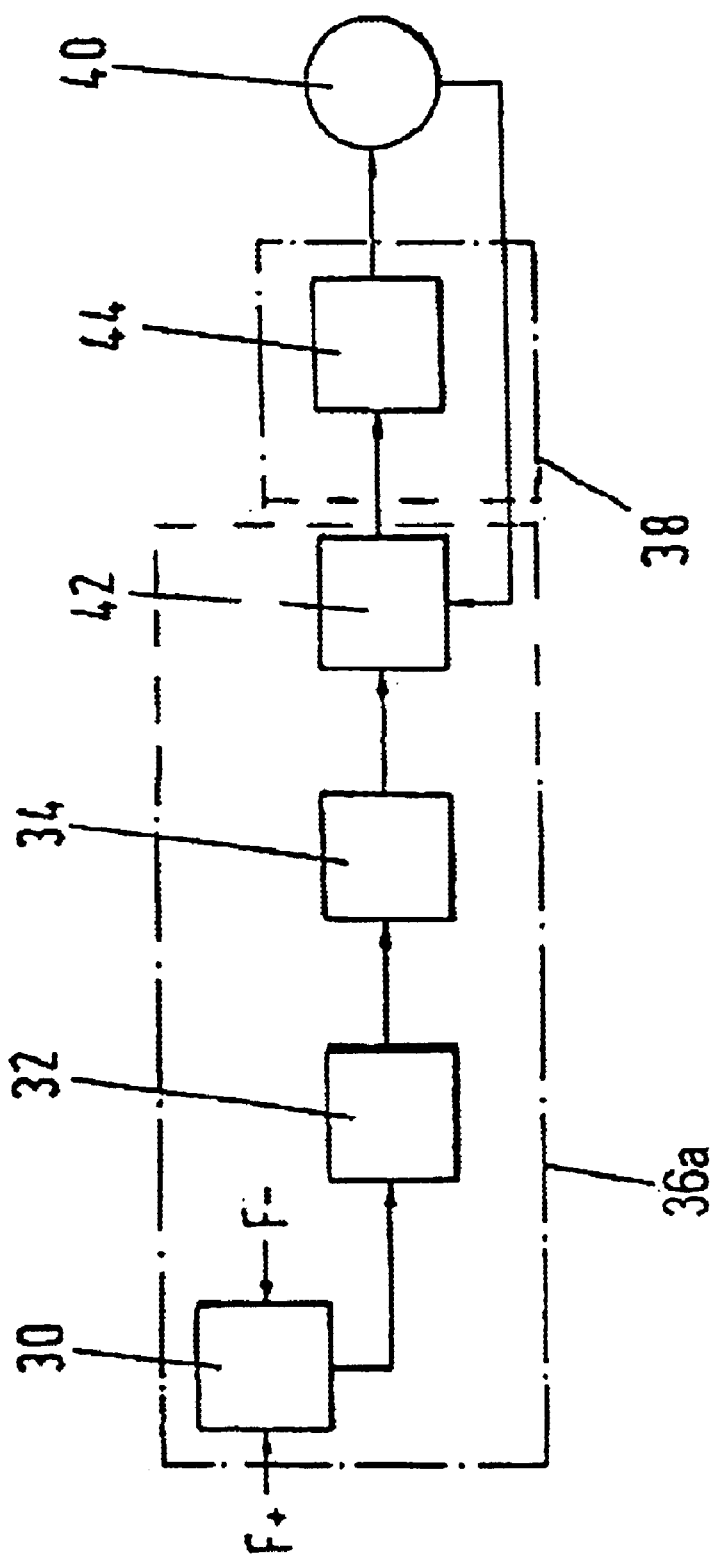
FIG. 6 is another block diagram of the drive control without consideration of the cutting force.

In the example of execution depicted in FIG. 3, the control signal is directed to a control unit 38 for the drive 40 of the rolling carriage 12, which consists of a controller 42 and a power output (and) stage 44 for the activation of the motor of drive 40. The control signal from the control mechanism 36 serves as a reference input value or a set value for the control unit 38 of the drive 40. FIG. 6 illustrates a variation of the control system shown in FIG. 3, wherein the controller 42 is part of the control mechanism 36a.

Figure 4:
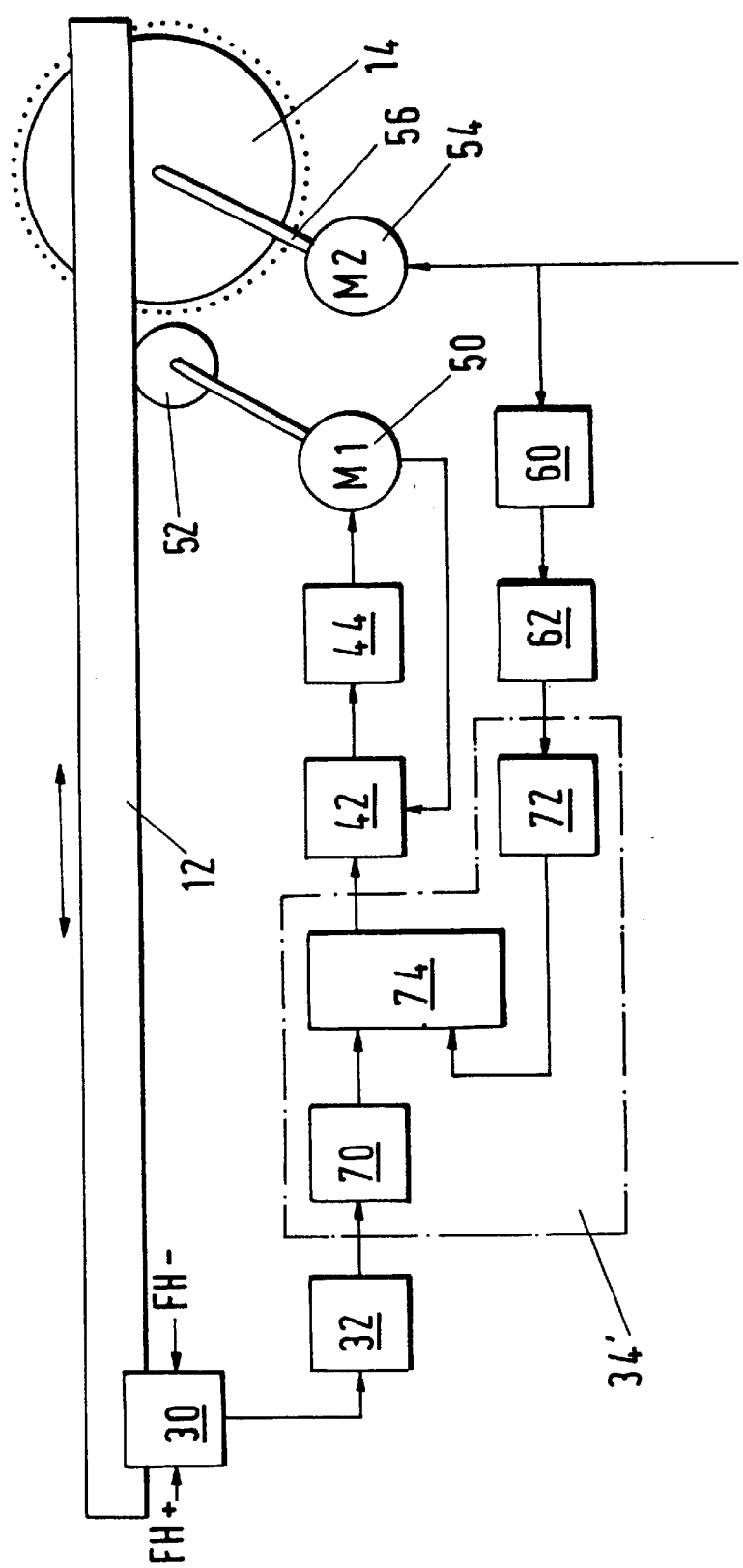
FIG. 4 is a block diagram of the drive control with consideration of the cutting force.

In a variant of the control of the drive for the rolling carriage 12 the cutting force is considered, as already described above. The block diagram of a corresponding drive control is depicted in FIG. 4. A modified control mechanism 36' includes the manual force sensor 30, measuring amplifier 32 and a modified control signal generator 34'. The manual-force sensor 30 and the measuring amplifier 32 correspond to those previously described. Also, the control unit 38 with controller 42 and the power output stage 44 does not differ from that previously described. It controls the drive motor 50, which is connected through a gear (transmission) 52 with the rolling carriage 12. The drive motor 50 and the gear (transmission) 52 are components of the drive 40. The gear (transmission) 52 is advantageously equipped with a detachable coupler (clutch), not shown, so that the rolling carriage 12 can be moved by hand, independently of the drive motor 50.

As already described above, the cutting force can indirectly be determined by the measuring of the motor power (consumption) of the motor 54 driving the main saw blade 14. Alternatively, it is also possible to measure the torsion of the drive shaft 56 of the main saw blade 14 with the aid of strain gauges, and thereby determine the cutting force. For the determination of the cutting force, the drive control depicted in FIG. 4 contains a cutting force sensor 60, whose output signal is, by a second measuring amplifier 62, converted and amplified to a value that is suitable for digital processing. The second measuring amplifier 62 supplies, if need be, a required auxiliary energy for the cutting force sensor 60. The measuring signal for the cutting force exiting the measuring amplifier 62 is fed to the control signal generator 34'.

The control signal generator 34' contains essentially three function blocks: A first function block 70 for the filtering and adaptation of the manual force measuring signal from the measuring amplifier 32, and a second function block 72 for the filtering and adaptation of the measuring signal for the cutting force arriving from the second measuring amplifier 62. The output signals from the two function blocks 70 and 72 are fed to a mixer 74.

The first function block 70 for the filtering and adaptation of the manual force measuring signal has already been described above in connection with the control signal generator 34 depicted in FIG. 3. The second function block 72 for the filtering and adaptation of the cutting force measuring signal functions similar to the first function block 70, i.e. a signal filter dampens first interferences and smoothens the measuring signal. In the signal adaptation (matching), the characteristic curve of the cutting force sensor 60 is adapted to the desired characteristic function curve. Additionally, possible threshold values and limit values are considered. The adaptation of the characteristic curve of the cutting force sensor occurs such that a rising cutting force results in a reduction of support of the feed motion of the rolling carriage by the drive.

In the mixer 74, the function values derived from the two actuating variables—manual force and cutting force—are brought together and are used for the creation of a set value (reference input value) for the control unit 38. The algorithm for this is realized in the mixer 74.

Figure 5:
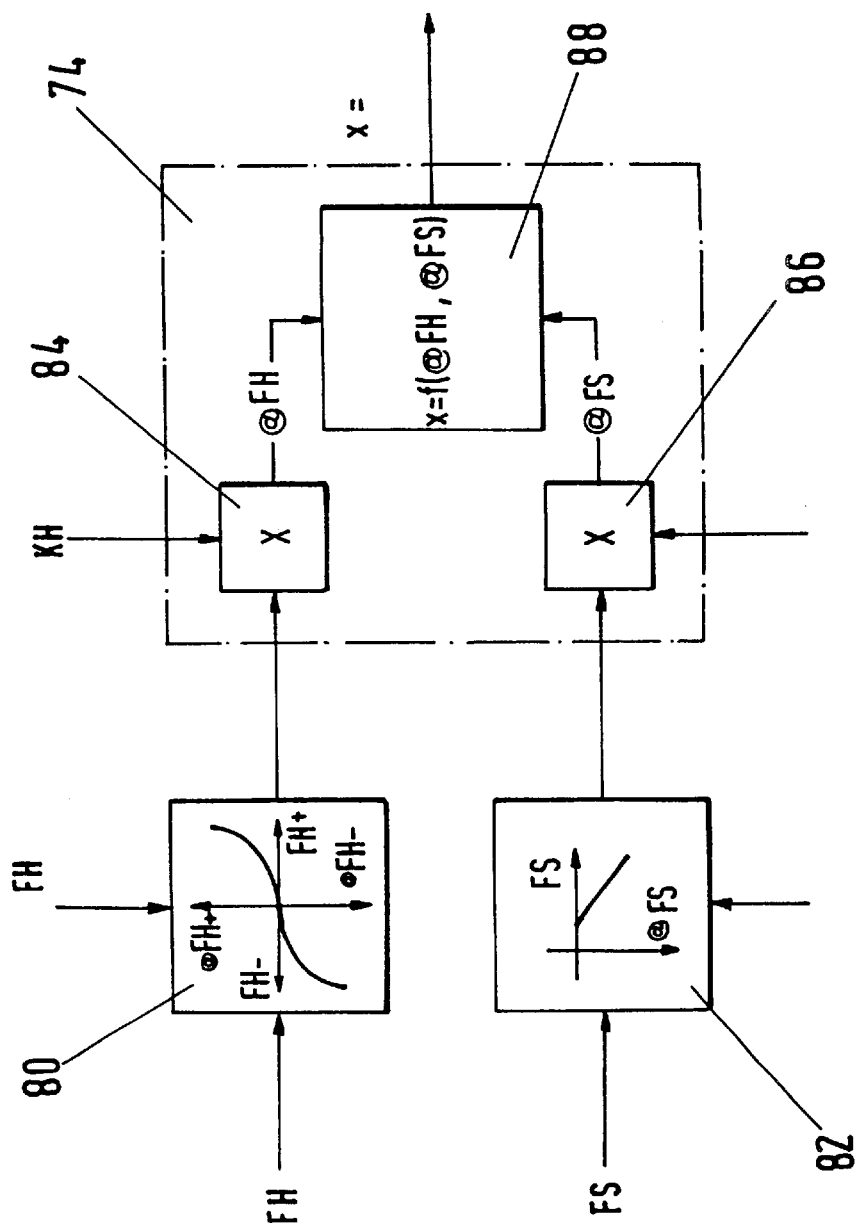
FIG. 5 is a block diagram of the control signal generator.

In FIG. 5, the control signal generator 34' is detailed (broken down) further. Recognizable are a first block 80 for the adaptation of the manual force measuring signal and a second block 82 for the adaptation of the cutting force measuring signal. Examples of suitable functions for the signal adaptation (matching) are graphically depicted in the two blocks 80 and 82. The manual force measuring signal FH is, in the course of the signal adaptation (matching), converted to the manual force function value @FH, and the cutting force measuring signal FS (is converted) to the cutting force function value @FS. The adaptation is here dependent on pre-settable function parameters.

The two function values @FH and @FS are subsequently weighted at (in) the blocks 84 and 86 in dependence on pre-settable evaluation parameters, and in an algorithm block 88 balanced against each other. The algorithm used in algorithm block 88 can here be preset. The blocks 84, 86 and 88 are components of the mixer 74 and are, like the blocks 80 and 82, realized in the form of a microcomputer that forms the control signal generator 34', so that the individual blocks 80 to 88 correspond to program modules of a program that needs to be processed by the microcomputer.

Figure 7:
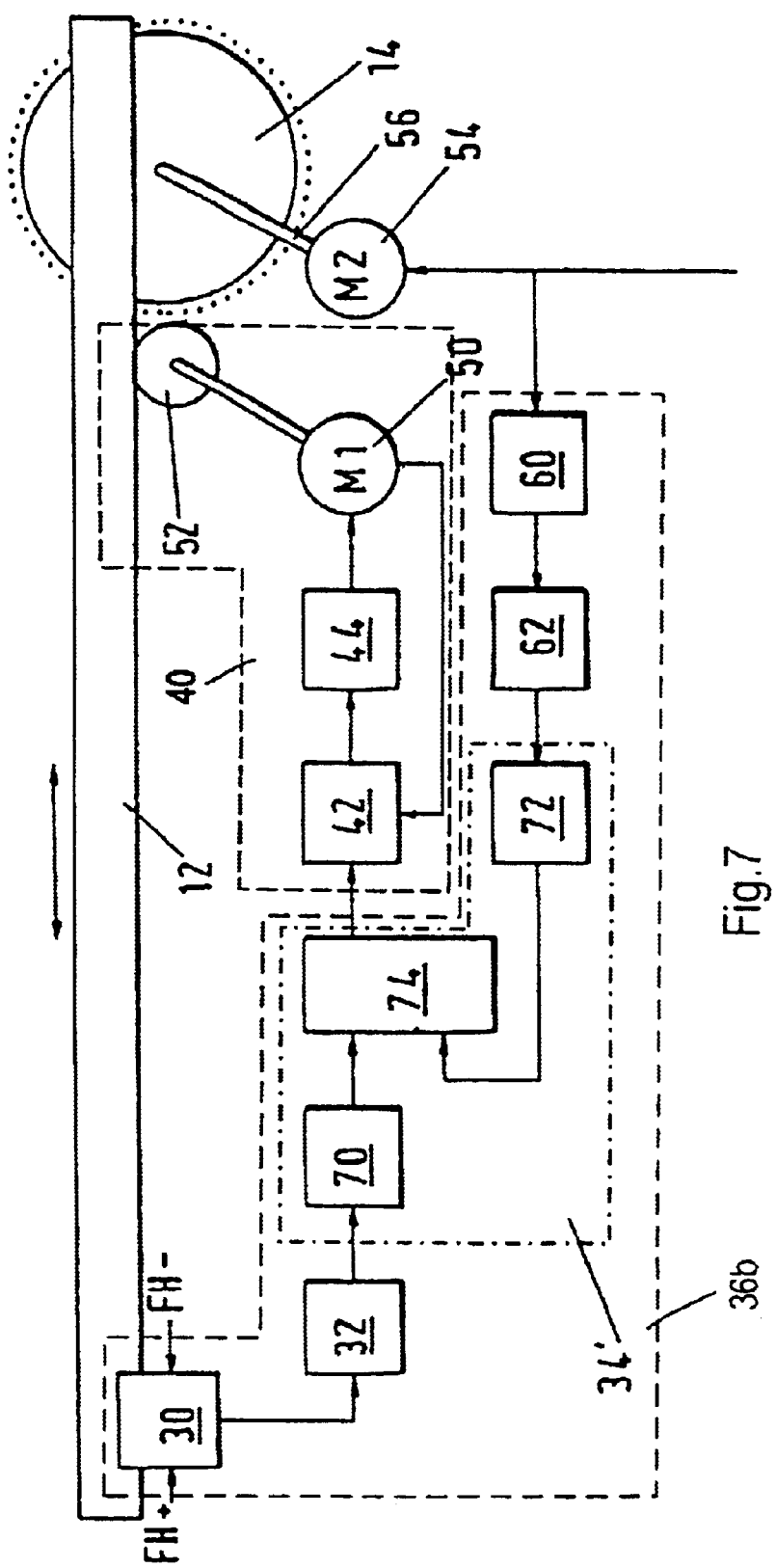
FIG. 7 is another block diagram of the drive control with consideration of the cutting force.

Another embodiment of the invention is illustrated in FIG. 7, in which the control mechanism 36b includes the cutting force sensor 60. In this embodiment, the controller 42 is also part of the feed drive 40'.

As already described above, a behavior of the rolling carriage can be obtained with the aid of the described process and the described device, as it is expected by the operator based on his experience. This allows an intuitive control of the rolling carriage drive and prevents shop accidents due to unforeseen behavior of the rolling carriage. Furthermore, the operator is substantially relieved in regard to the force required for the rolling carriage drive.

What is claimed is:

1. In a machine tool having a cutting element and a workpiece table that is moveable by a motorized feed drive in a direction of feed, past the cutting element, and by an operator applying a manual force to the workpiece table, the improvement comprising:
   a control mechanism to vary a drive force of the motorized feed drive, the control mechanism including
      a manual force sensor to sense the manual force applied by the operator, the manual force sensor mounted to the workpiece table for movement therewith, and
      a control signal generator operably connected to the manual force sensor and to the motorized feed drive for generating a control signal for the motorized feed drive in response to the sensed manual force, thereby controlling the drive force applied by the motorized feed drive, supplemental to the manual force, to the workpiece table.

2. The improved machine tool according to claim 1, further comprising a sensor unit which contains the manual force sensor, the sensor unit further including a measuring amplifier, and the sensor unit forming a part of the control mechanism.

3. The improved machine tool according to claim 1, wherein the control mechanism further includes at least one device for the determination of an actual cutting force of the cutting element, the device being operably connected to the control signal generator.

4. The improved machine tool according to claim 1, wherein the control mechanism further includes an element for pre-setting a negative feed rate.

5. The improved machine tool according to claim 1, further including a controller connected between the control signal generator and the motorized feed drive to control speed of the motorized feed drive, whereby the feed rate of the workpiece table is controlled.

6. The improved machine tool according to claim 5, wherein the controller is part of the control mechanism.

7. The improved machine tool according to claim 5, wherein the controller is part of the feed drive.

8. In a machine tool having a cutting element and a workpiece table that is moveable by a motorized feed drive for feeding a workpiece to the cutting element, the improvement comprising:
   a control mechanism to vary a speed of the motorized feed drive, the control mechanism including
      a manual force sensor mounted to the workpiece feed table for movement therewith,
      a control signal generator operably connected to the manual force sensor and to the motorized feed drive, and at least one device for the determination of an actual cutting force of the cutting element, the at least one device being operably connected to the control signal generator, wherein the control signal generator generates a control signal that is sent to the motorized feed drive to vary the speed of the motorized feed drive, the control signal that is generated being based on input from the manual force sensor and the at least one device.

9. The machine tool according to claim 8, further comprising a sensor unit which contains the manual force sensor, the sensor unit further including a measuring amplifier, and the sensor unit forming a part of the control mechanism.

10. The improved machine tool according to claim 8, wherein the control mechanism further includes an element for pre-setting a negative feed rate.

11. The improved machine tool according to claim 8, further including a controller connected between the control signal generator and the motorized feed drive to control speed of the motorized feed drive, whereby the feed rate of the workpiece table is controlled.

12. The improved machine tool according to claim 11, wherein the controller is part of the control mechanism.

13. The improved machine tool according to claim 11, wherein the controller is part of the feed drive.

* * * * *